Figure 8:
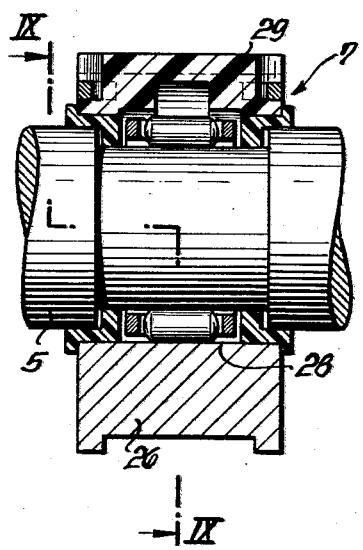

July 23, 1963     S. STANEFF     3,098,684
BEARING SEALS FOR BOTTOM DRAFTING ROLLERS
Filed Dec. 23, 1960     4 Sheets-Sheet 1
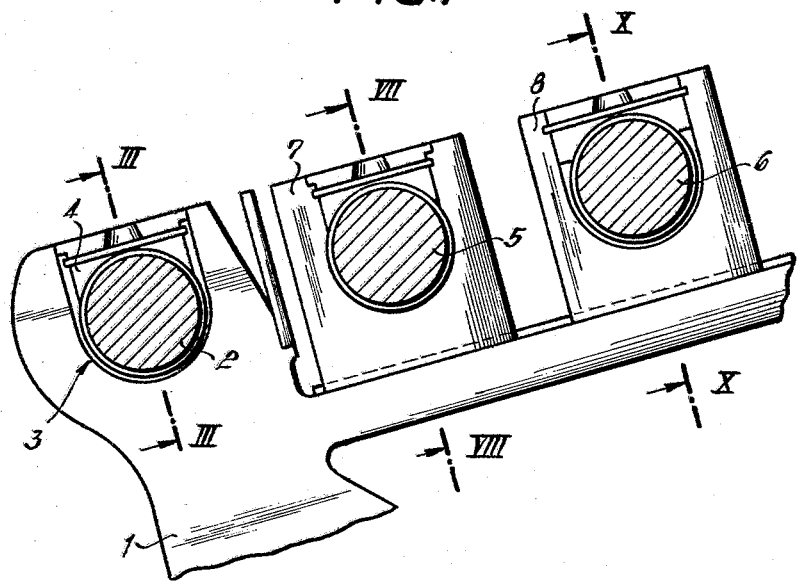
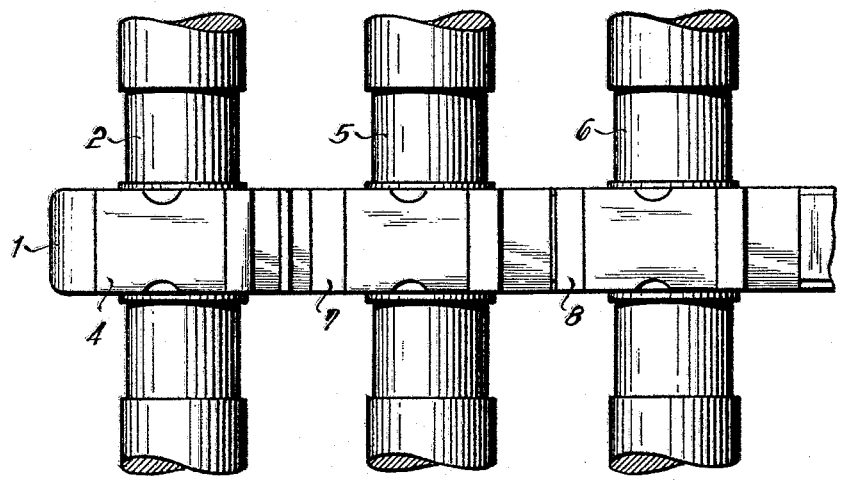
INVENTOR
Stefan Staneff
By
Watson, Cole, Grindle & Watson
Attys.

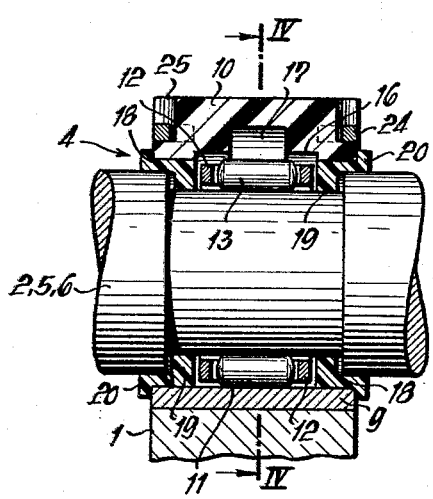
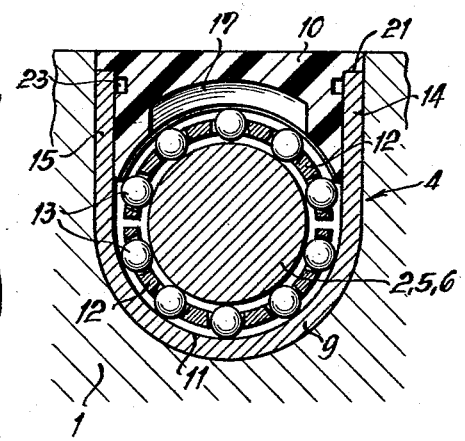
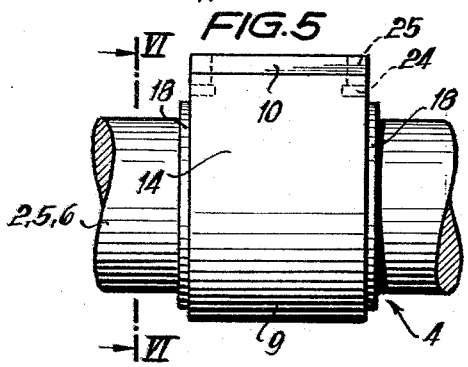
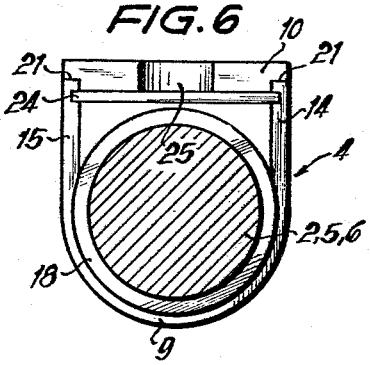
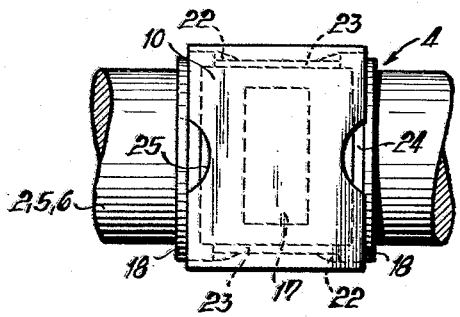

July 23, 1963  S. STANEFF  3,098,684
BEARING SEALS FOR BOTTOM DRAFTING ROLLERS
Filed Dec. 23, 1960  4 Sheets-Sheet 3

INVENTOR
Stefan Staneff
By
Watson Cole Grindle & Watson
Attys.

United States Patent Office 3,098,684
Patented July 23, 1963

3,098,684
BEARING SEALS FOR BOTTOM DRAFTING ROLLERS
Stefan Staneff, Herzogenaurach, near Nurnberg, Germany, assignor to Industriewerk Schaeffler & HG, Herzogenaurach, near Nurnberg, Germany, a German company
Filed Dec. 23, 1960, Ser. No. 77,907
Claims priority, application Germany Jan. 16, 1960
4 Claims. (Cl. 308—187.1)

This invention relates to antifriction bearings for bottom rollers of drafting mechanisms in spinning machines.

In recent years, antifriction bearings have been used more and more for supporting bottom rollers of drafting mechanisms in spinning machines, in order to obtain a longer working life and also the advantage of reduced maintenance. However, hitherto it has not been possible to solve completely the problem of sealing such bearing units, since conventional gap packings cannot provide adequate protection against the penetration of the fibre fluff and dust produced by the textile machines, and sliding packings on the other hand require too great an expenditure of energy. Therefore, in the case of textile machines, it has been necessary to clean the bearing units frequently, which entails considerable expense in view of the large number of bearings used, particularly in drafting mechanisms. Not only is it necessary to dismantle the corresponding bearing, but the adjoining bearing units must at least be released also, which involves intricate dismounting with the possibility of damage to the bottom rollers and long periods during which the machine is out of use, so that the advantage of reduced maintenance obtained with this kind of bearing as compared with the earlier sliding bearings is partly cancelled out.

In order to facilitate assembly and the inescapable cleaning which is necessary from time to time even when needle bearings are used, it is convenient to provide divided bearings with divided cages, but these must be so constructed that they can be assembled or dismantled without separating the individual bottom roller pieces from one another. The U-shaped, upwardly open recesses in the roller stand make it easier to satisfy this condition. Release of the individual bottom roller pieces from one another is not necessary if the width of the outer ring is smaller than the space available adjacent the bearing unit, and if the diameter of the bottom roller is smaller than the bore of the outer race for the bearing.

The non-divided bearing for bottom rollers which have been used hitherto can only be positioned at the coupling systems connecting the individual bottom roller pieces. Thus, the manufacturing errors in the bottom roller coupling and in the bottom roller bearing combine with one another to lead to undesirable deviations from true running of the bottom roller. It is difficult to eliminate these errors, and in addition they are complicated by any inaccuracies in the roller stand.

The use of a divided bearing affords the advantage that it can be placed between two coupling systems, an appropriately shaped recess in the bottom roller being required for this purpose. The advantage is obtained that the coupling systems can be provided with large centering diameters and defects in shape are not added to one another. Easier subsequent adjustment of the bottom roller is thereby made possible.

The object of the invention is to provide a sealed antifriction bearing of the minimum possible radial bulk, which can be assembled and dismantled in a simple manner with the bottom roller pieces still coupled together, and at the same time can accommodate a sufficient supply of lubricant. providing the optimum freedom from maintenance and ensuring that replenishment of lubricant need only be carried out at long intervals. Also, by making the bearing, more particularly the divided needle cage, visible, it is also intended to permit the operation of the bearing to be supervised at any time and to enable an operator to check the remaining supply of lubricant.

According to the invention there is provided an antifriction bearing for the bottom rollers of drafting mechanisms in spinning machines, the bearing comprising rolling elements, a lower part provided with a raceway for said elements, an upper part detachably secured to the lower part to cover the rolling elements, and sealing means at opposite ends of the bearing.

Figure 9:
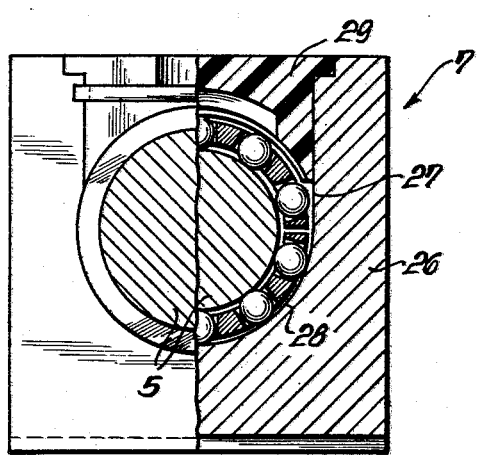
Figure 10:
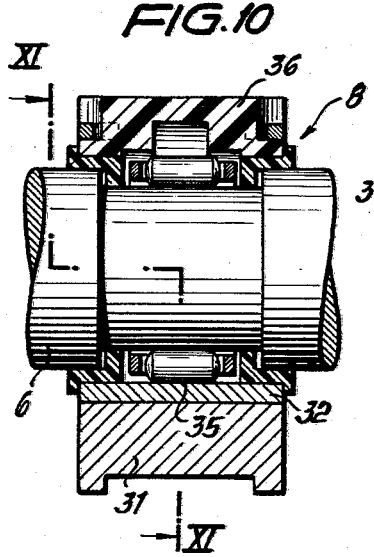
Figure 11:
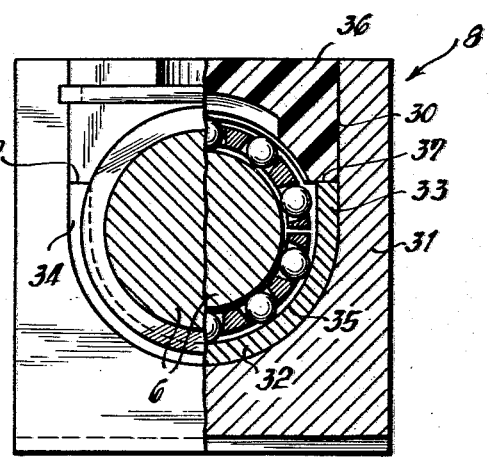
Figure 12:
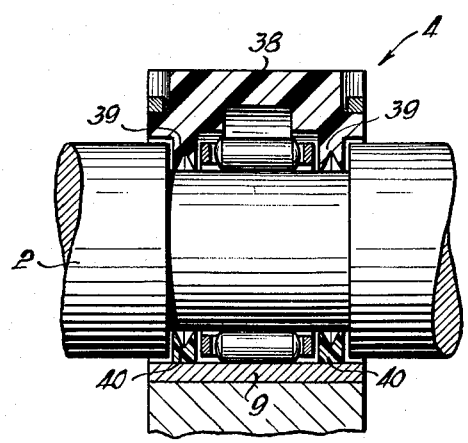
Figure 13:
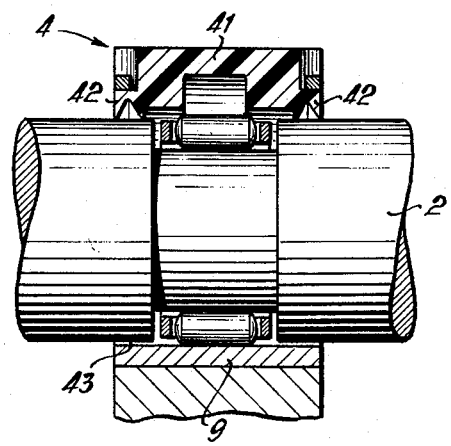

For a better understanding of the invention and to show how the same may be carried into effect, reference will now be made, by way of example, to the accompanying drawings, in which:

FIGURE 1 is a side view of a supporting arrangement for a plurality of bottom rollers of a drafting mechanism of a spinning machine, FIGURE 2 is a plan view of the arrangement of FIGURE 1, FIGURE 3 is a sectional view, on a larger scale, taken on the line III—III of FIGURE 1, FIGURE 4 is a cross-sectional view on the line IV—IV of FIGURE 3, FIGURE 5 is an elevational view of the bearing shown in FIGURE 3, FIGURE 6 is a side view of the bearing taken on the line VI—VI of FIGURE 5, FIGURE 7 is a plan view of the bearing shown in FIGURE 5, FIGURE 8 is a sectional view, on a larger scale, taken on the line VIII—VIII of FIGURE 1, FIGURE 9 is a sectional view taken on the line IX—IX of FIGURE 8, FIGURE 10 is a sectional view, on a larger scale, taken on the line X—X of FIGURE 1, FIGURE 11 is a view, partly in section, taken on the line XI—XI of FIGURE 10, FIGURE 12 is a view of a modified form of the bearing shown in FIGURE 3, and FIGURE 13 shows a further modification of the bearing shown in FIGURE 3.

In FIGURE 1, a roller stand 1 is provided with an upwardly open recess 3 for receiving a delivery roller 2, the recess 3 accommodating a bearing 4 which supports the delivery roller. The bearing 4 is adapted in shape to fit the recess 3. Carriages for supporting further bottom rollers are generally arranged in a displaceable and lockable manner on the roller stand 1 but as will be seen from FIGURE 1 the carriages have been replaced by bearings 7 and 8 which support further bottom rollers 5 and 6. Different possible forms of bearing are illustrated in FIGURE 1.

In FIGURES 3 and 4, the bearing shown consists of a U-shaped lower part 9 and a detachable upper part 10 which is preferably made of transparent synthetic plastic material. This enables the amount of lubricant remaining in the bearing to be checked visually. The outer form of the upper and lower parts, which are connected together, is adapted to the form of the recess 3 of the roller stand 1 (see FIGURE 1), so that the bearing is secured against rotation in the roller stand. The lower part 9 is provided on the internal surface of the curved portion thereof with a raceway 11 for needles 13. The needles 13 carried in a two-part cage 12, roll on the raceway 11 in order to support the roller 2, 5 or 6. The detachable upper part 10, guided in limbs 14 and 15 of the lower part 9, serves as a top cover for the bearing and as a guide for the upper half of the cage 12. In order to avoid the divided cage 12 from being jammed when the upper part 10 is introduced into the U-shaped lower part 9, the upper part is cut away in the region of the needle raceway 16, thus leaving a clearance between the upper part and the needles 13. A chamber 17 for accommodating lubricating grease is situated directly above the needles 13 in the upper part 10. The provision of the chamber 17 means that the bearing need only be re-lubricated at infrequent intervals. The bearing is sealed at both its axial ends by packing rings 18 which are made of elastic material and which are provided with radially directed collars 19 and 20. Thus, in addition to providing a sliding sealing arrangement the collars 19 and 20 also prevent the bearing and the divided needle cage from executing movement in the axial direction. The packing rings 18 are preferably slit in order to facilitate assembly, the slit being situated approximately at an angle of 60° to the axis of the bearing and so constructed that the outer edge of the slit is situated in the direction of rotation of the bottom roller. This avoids the possibility of fibre fluff getting into any gap which may remain.

FIGURES 5, 6 and 7 illustrate how the upper part 10, which bears against an abutment portion 21 of the limbs 14 and 15 of the lower part 9, is secured in position. The inner surfaces of the limbs 14 and 15 are provided with grooves 22 opposite which there are associated slots 23 in the outer surfaces of the upper part 10. Clips 24 are inserted in the grooves 22 and slots 23, thus effecting a secure connection between the lower part 9 and the upper part 10. The upper part 10 is provided with apertures 25 in order to facilitate removal of the clips 24.

FIGURES 8 and 9 show in more detail the bearing 7 shown in FIGURE 1. The lower part 26 is constructed as a displaceable and lockable slide and the U-shaped recess 27 therein is provided with a raceway 28 for the needles. The securing of an upper part 29 to the lower part 26 and also the necessary guiding arrangement are effected as has already been illustrated in FIGURES 3 to 7.

If it is not possible to provide the lower part 26 with a raceway 28, then, as illustrated in FIGURES 10 and 11, the U-shaped recess 30 of the lower part 31 must be supplemented by a correspondingly shaped insert piece 32. The length of the two limbs 33 and 34 is such that there is a satisfactory transition between the raceway 35 on the insert piece 32 and the guideway of the upper part 36. The upper part 36 is guided and secured as already described with reference to FIGURES 3 and 4. The abutment 37 which prevents the rolling elements from becoming jammed by the upper part is not stepped.

In the case of the bearing shown in FIGURE 12, a detachable upper part 38 is provided at both axial ends with a profiled portion 39 which, in the region of the upper part 38, takes the place of the sliding packing ring 18. The portions 39 also secure the bearing in position in the axial sense relatively to the bottom roller and secures the divided needle cage in the axial sense relatively to the bearing. A part 40 of a packing ring is then inserted at each side in the lower portion of the bearing.

FIGURE 13 shows a further example of embodiment for sealing the bearing. The detachable upper part 41 is also provided at both ends with a profiled portion 42 constituting a sliding packing, whilst in the lower region the bearing is sealed by means of a gap seal 43 formed by the bottom roller 2 and the U-shaped lower part 9.

I claim:

1. An antifriction bearing assembly for the bottom rollers of drafting mechanisms in spinning machines, the assembly comprising a bearing having rolling elements, a lower part having a U-shaped recess provided with a raceway for said elements, an upper part disposed between the limbs of the U of the recess to cover the rolling elements, there being co-operating recesses in said limbs and said upper part, clips inserted in the co-operating recesses to lock the upper part in the U-shaped recess of the lower part, and sealing means at opposite ends of the bearing.

2. An antifriction bearing for the bottom rollers of drafting mechanisms in spinning machines, the bearing comprising rolling elements, a lower part provided with a raceway for said elements, an upper part detachably secured to the lower part to cover the rolling elements, and sealing means at opposite ends of the bearing, said sealing means including a packing ring of elastic material, and each ring has a plurality of collars.

3. A bearing according to claim 1, in which the upper part is composed of a synthetic material, and said sealing means comprising profiled portions facing radially inwardly on each end of said upper part and a packing ring on said lower part of said U-shaped recess.

4. A bearing according to claim 1, in which the upper part is composed of a synthetic material, and said sealing means comprising profiled portions facing radially inwardly on each end of said upper part and said lower part of said U-shaped recess adapted to form a gap seal with a bottom roller.

References Cited in the file of this patent

UNITED STATES PATENTS

| | | |
|---|---|---|
| 1,136,077 | Wiking et al. | Apr. 20, 1915 |
| 2,592,718 | McGhee | Apr. 15, 1952 |
| 2,682,435 | Rien et al. | June 29, 1954 |